June 5, 1956   S. F. ANDERSON   2,748,726
SANDWICH MAKING MACHINE
Filed Dec. 10, 1952   5 Sheets-Sheet 1

Inventor
Swan F. Anderson
By McCanna and Morsbach
Attys

June 5, 1956 S. F. ANDERSON 2,748,726
SANDWICH MAKING MACHINE
Filed Dec. 10, 1952 5 Sheets-Sheet 2

Fig. 3

Inventor
Swan F. Anderson
By McCanna and Morsbach
Attys.

June 5, 1956 S. F. ANDERSON 2,748,726
SANDWICH MAKING MACHINE
Filed Dec. 10, 1952 5 Sheets-Sheet 3

Inventor
Swan F. Anderson
By McCanna and Morsbach
Attys.

June 5, 1956　　　S. F. ANDERSON　　　2,748,726
SANDWICH MAKING MACHINE
Filed Dec. 10, 1952　　　5 Sheets-Sheet 4

Inventor
Swan F. Anderson
By McCanna and Morsbach
Attys

United States Patent Office 2,748,726
Patented June 5, 1956

2,748,726

SANDWICH MAKING MACHINE

Swan F. Anderson, Rockford, Ill., assignor of one-half to Swan F. Anderson and one-half to Ralph F. Anderson, Rockford, Ill.

Application December 10, 1952, Serial No. 325,190

14 Claims. (Cl. 107—1)

This invention relates to machines for making sandwiches of ice cream and the like.

Ice cream sandwiches of the type comprising a layer of ice cream disposed between two cookies have become a popular confection. In some instances such sandwiches are made manually at the time of purchase and are apt to be unsanitary because of manual handling of the ingredients. Even when made at a central plant the operation has heretofore involved considerable handling of the cookies. Furthermore the cost of making them has been comparatively expensive.

An object of this invention is the provision of a machine for forming ice cream sandwiches and the like in a sanitary manner, at a relatively high rate of production and at a relatively low cost.

Another object of this invention is the provision of a sandwich making machine wherein the components may be readily assembled and disassembled for effective cleaning.

A further object of the invention is the provision of a sandwich machine wherein the cookies or other outer members of the sandwich are mechanically applied to the opposite sides of a flowing stream of filler material as the material emerges from the nozzle and the stream is severed by ejection of the sandwich across the end of the nozzle.

Another object of the invention is the provision of a sandwich making machine of the above character having novel means for feeding cookies along preselected paths.

A still further object is the provision of a sandwich machine having novel feeding means for the filler material and the outer members to form sandwiches at a relatively high rate of speed and novel means for packaging the finished sandwiches.

Another object of the invention is the provision of a sandwich making machine having novel means for supporting the cookies during the formation of the sandwich.

Another object of the invention is the provision of a sandwich making machine which is efficient, rugged, requires a minimum of maintenance, and is relatively inexpensive to produce.

Another object of the invention is the provision of a sandwich making machine having novel means for coordinating movements of the component parts of the machine.

Other objects and advantages of the invention will become apparent from the following detailed description taken in connection with the accompanying drawings in which—

Sandwich forming mechanism

Figure 1:
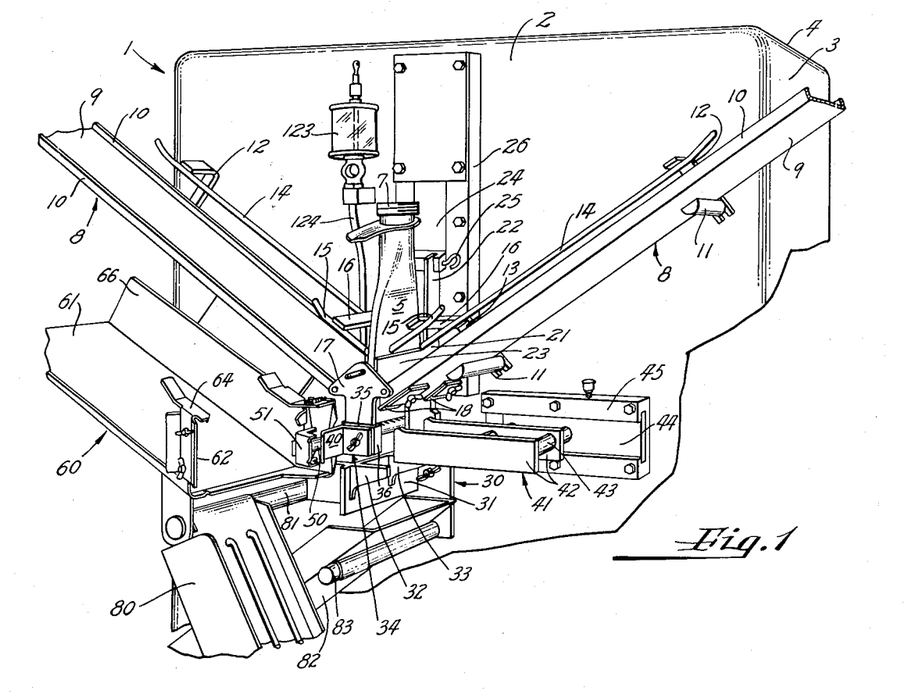
Figure 1 is a fragmentary perspective view of the machine of the present invention, taken from the front of the machine.

Referring to Fig. 1, the machine includes a support in the form of a cabinet or housing 1 having a front panel 2, a removable back, not shown, side panels 3, and a top 4. A downwardly extending nozzle 5 having a rectangular discharge opening 6 (Figs. 3–9) at its lower end is rigidly mounted on the front panel 2 of the housing by suitable means, not shown, and at its upper end 7 is threaded for attachment to a discharge conduit (not shown) leading from a conventional ice cream freezer. In the operation of the machine, ice cream from the freezer in a semi-liquid or plastic condition is discharged in a rectangular, continuous, sheet-like stream downwardly out the discharge opening 6 at the lower end of the nozzle 5.

Figure 3:
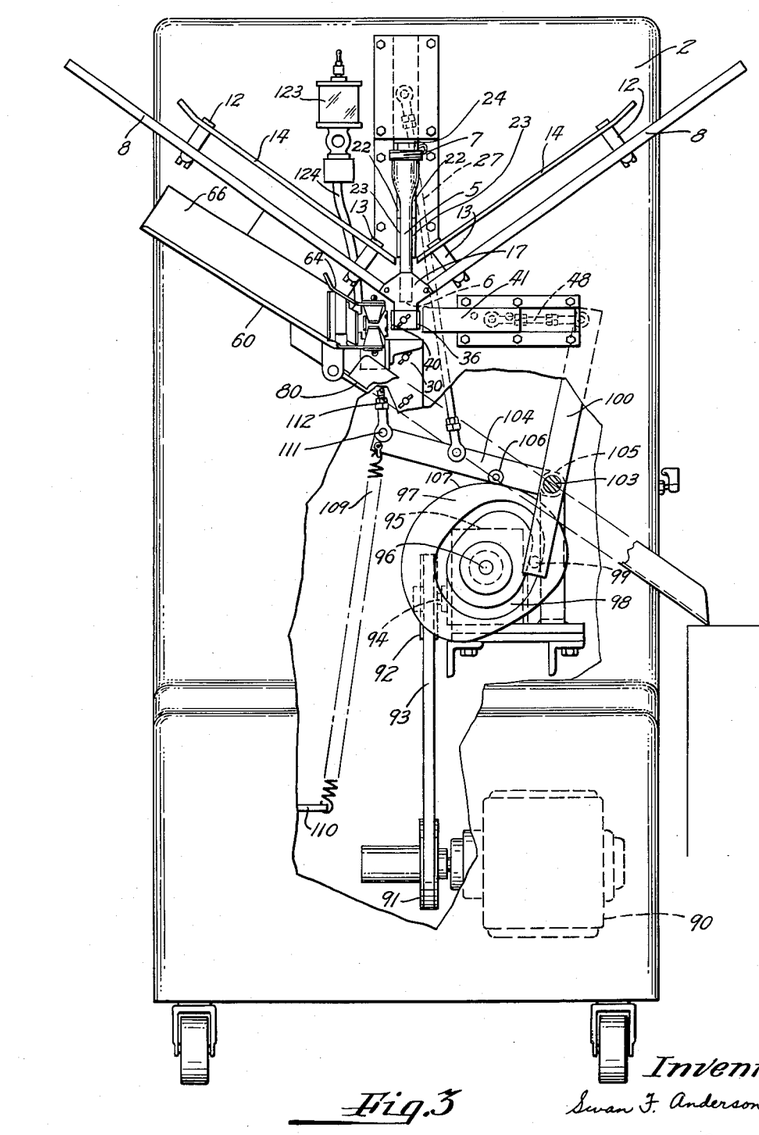
Figure 3 is a front elevational view of the machine, with parts broken away to better illustrate the operation of the machine.
Figure 4:
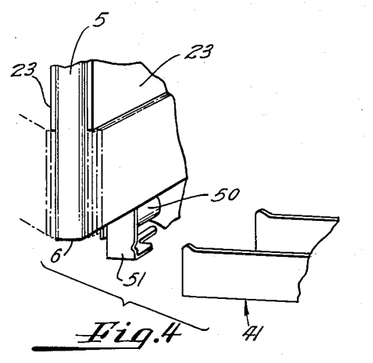
Figures 4–9 are fragmentary perspective views showing the successive positions of the sandwich forming mechanism of the machine during the formation of a sandwich.

Magazines for storing cookies or wafers for the ice cream sandwiches are disposed on opposite sides of the nozzle 5 at the front of the housing 1. As best seen in Figs. 1 and 3, each of the cooky magazines includes an upwardly facing, U-shaped channel plate 8 having its lower end located adjacent the discharge opening of the nozzle 5 and extending outwardly and upwardly at an angle therefrom at the front of the housing. Each of these channel plates of the cooky magazines has a flat bottom wall 9, which is substantially the width of the cookies to be stored in the magazines, and upturned sides 10. At their undersides the magazine plates 8 carry attachment arms 11 which extend through holes in the front panel 2 of the housing and which are adapted to rigidly mount the magazine plates on the front panel of the housing by means of wing nuts (not shown) at the back side of the front panel threadedly engaging the threaded inner ends of the attachment arms 11. The cooky magazines also include cooky guides positioned to overlie the channel-shaped plates 8. Each of these cooky guides includes the integral assembly (Figs. 1 and 3) of spaced right-angled bracket members 12 and 13, which are bifurcated at their lower ends to straddle the attachment arms 11 and which at their upwardly extending sides are clamped between the front panel 2 of the housing and the inner side of the respective channel shaped magazine plate 8, elongated rod 14 which is suitably rigidly secured to the overhanging upper legs of the bracket members 12 and 13, and relatively short rod 15 rigidly attached to the underside of the overhanging upper leg 16 of the lower bracket member 13. The rods 14 and 15 are positioned to overlie the top edges of the cookies carried by the magazine plates 8 to insure that the cookies engage the bottom wall 9 of the respective magazine plate.

At their lower ends, the magazine plates 8 are bolted to a bracket member 17 secured to the lower end of the nozzle. The lower ends of the magazine plates 8 terminate in spaced relation from the sides of the nozzle 5 at its lower end (Figs. 3 and 10) to provide cooky discharge openings at the lower ends of the cooky magazine, the spacing between the lower ends of the magazine plates 8 and the nozzle 5 at these cooky discharge openings being slightly greater than the thickness of a single cooky. For releasably retaining in place the lowermost cooky in each stack, there are provided lips 18 (Figs. 1 and 13) of resilient flexible material, such as rubber, attached to the underside of the magazine plates 8 at their lower ends by means of pressure plates 19 and wing nuts 20. Each lip 18 projects beyond the lower end of the magazine plate on which it is mounted and engages the lower edge of the lowermost cooky in the stack to retain it in place.

Figure 13:
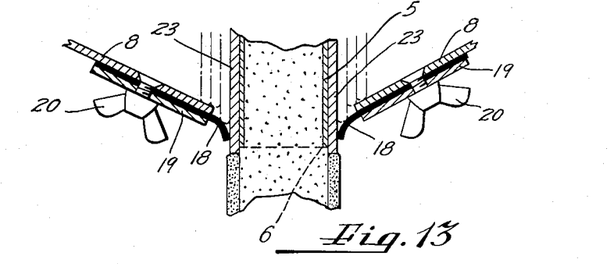
Figure 13 is a section through the lower end of the discharge nozzle and the lower ends of the cooky magazines of the machine.

For feeding the lowermost cooky in each stack from the lower end of the magazine there are provided the reciprocatory cooky feed plates 21 positioned to reciprocate vertically between the lower ends of the cooky magazines and the respective sides of the nozzle 5. Each of these cooky feed plates is generally L-shaped in configuration, having an upwardly extending stem 22 and a lower toe portion 23 extending directly outward from the front wall of the housing. The toe portions 23 of the feed plates are positioned to reciprocate vertically at opposite sides of the nozzle 5 between the nozzle and the lower ends of the cooky magazines. The toe portion 23 of each feed plate is of substantially the same thickness as a single cooky. When the cooky feed plate 21 is moved downward the toe portion 23 engages the upper edge of the lowermost cooky in the stack and pushes the same downward, forcing the cooky-retaining lips 18 to one side as the cooky is moved downward to be positioned at one side of the nozzle 5 just below the discharge opening 6 therein (Fig. 13).

For reciprocating the cooky feed plates there is provided the reciprocatory shuttle member 24 to which the upper ends of the stems 22 of the cooky feed plates are attached by a lock pin 25. The shuttle member 24 and the cooky feed plates 21 are guided for vertical movement along ways defined by the stationary slide member 26 bolted to the front panel of the housing 1. The shuttle member 24 at its back side carries a pin which extends through aligned vertically elongated apertures (not shown) in the slide member 26 and the front panel of the housing and is connected pivotally at the back side of the front panel to a cam-operated connecting rod 27 (Fig. 3). As described in detail hereinafter, the connecting rod 27 causes the shuttle member 25 and the cooky feed plates 21 to reciprocate vertically to discharge cookies simultaneously at opposite sides of the nozzle 5.

Figures 10, 11, 12:
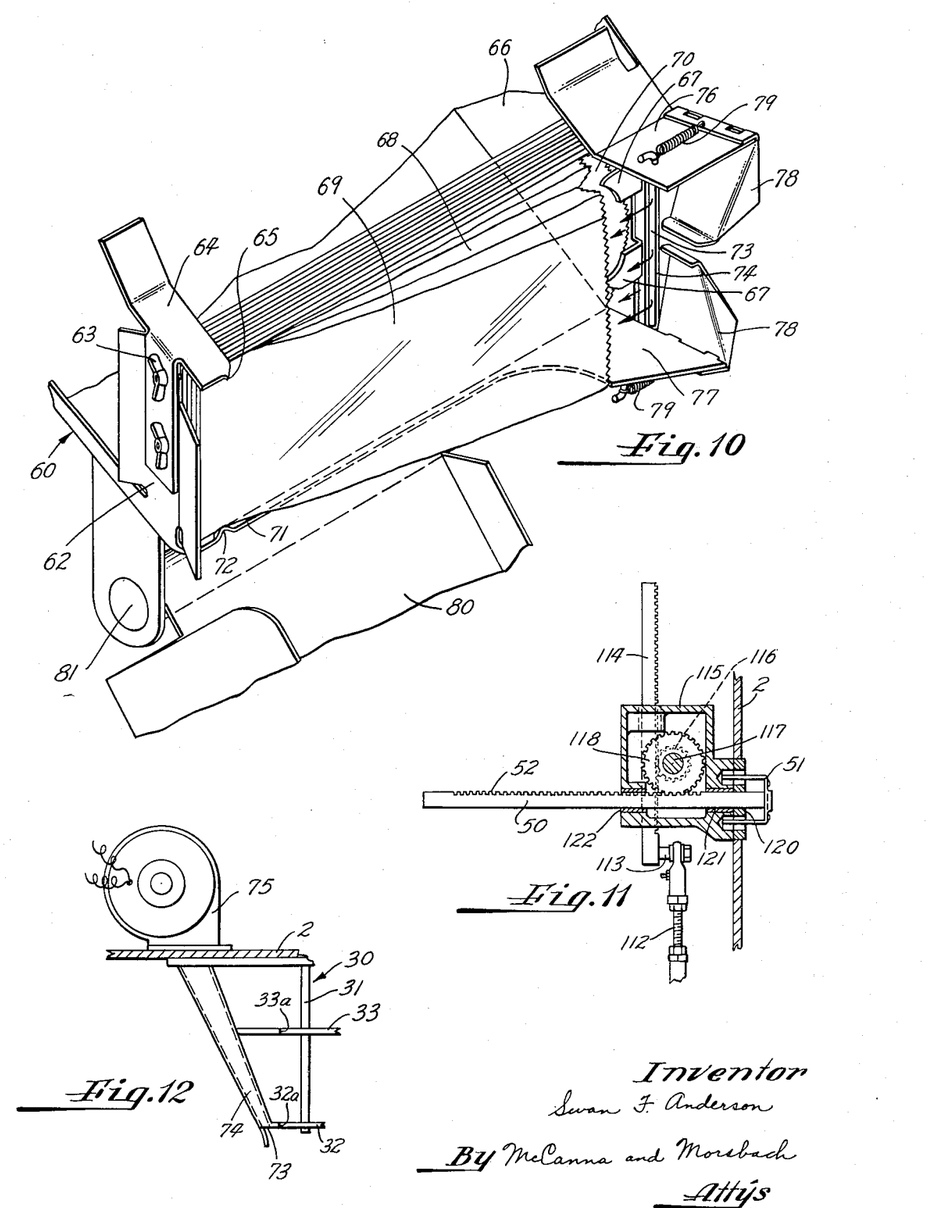
Figure 10 is a fragmentary perspective view showing the arrangement in the present invention for supporting open ended bags which receive the formed sandwiches.
Figure 11 is a section showing details of the drive to the mechanism for inserting the formed sandwiches into bags.
Figure 12 is a top view of the arrangement for blowing air into open end of the bag at the lower end of the magazine.

In the operation of the mechanism thus far described, cookies are stacked on the magazine plates 8 to extend in vertical edgewise relation. Ice cream is fed from the freezer in a semi-liquid or plastic state to the nozzle 5 and is discharged downwardly out of the discharge opening 6 at the lower end of the nozzle in a continuous sheet-like stream. The lowermost cooky in each stack of cookies on opposite sides of the nozzle is supported by the rubber lips 18 at the lower end of the respective cooky magazine to extend upwardly at the adjacent side walls of the nozzle. As the ice cream is discharged from the nozzle, the cooky feed plates 21 are moved downwardly simultaneously to engage the upper edges of these lowermost cookies and push them downwardly. The cookies in moving downward deflect the resilient supporting lips 18 at this time and the cookies move to spaced parallel relation on opposite sides of the nozzle below the nozzle discharge opening 6 (Fig. 10). The cookies are moved downward at this time at a substantially faster speed than the descent of the ice cream stream discharged by the nozzle 5. The ice cream in flowing out of the nozzle expands and engages the adjacent inner faces of the cookies thus positioned, so that a sandwich may be formed from the cookies and the layer of ice cream engaged between these cookies. Thereafter, the cooky feed plates 21 are retracted upwardly above the upper edges of the next cookies in the magazines, permitting these cookies to move down onto the supporting lips 18 at opposite sides of the nozzle to thereafter be fed downwardly by the cooky feed plates in the same manner.

Sandwich transfer mechanism

Provision is made for supporting the cookies below the nozzle during the forming of the sandwich. In the illustrated embodiment of the present invention this support means is in the form of a bracket, indicated generally at 30 (Fig. 1), bolted to the front panel 2 of the housing 1. This support bracket includes an integral leg 31 extending outwardly from the front panel of the housing directly in line with the discharge opening 6 of the nozzle in spaced relation therebelow. A pair of spaced legs 32 and 33 are formed integral with the leg 31 and extend transversely on opposite sides thereof in the direction in which the formed sandwich is to be ejected from beneath the nozzle to permit the formation of the next sandwich. The legs 31—33 of the bracket have flat, co-planar upper faces which support the lower edges of the cookies during the formation of a sandwich and which support the lower side of the formed sandwich as it is transferred from beneath the nozzle 5.

Figure 14:
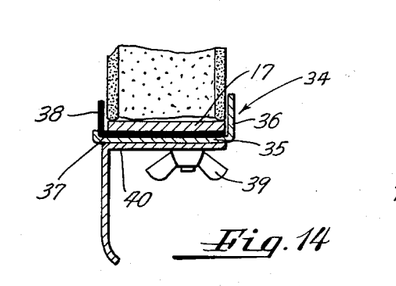
Figure 14 is a section showing the retainer assembly for retaining the cookies upright below the nozzle during the formation of a sandwich.

While the cookies rest on the support bracket 30 during the formation of a sandwich as above described they are maintained in upright edgewise relation. To this end there is provided a retainer assembly, indicated generally at 34 in Fig. 1, attached to the lower end of the bracket 17 at the lower end of the nozzle 5. As best seen in Fig. 14, this retainer assembly includes an L-shaped rigid metal plate 35 having a lip 36 positioned to extend upwardly along the outer face of the cooky feed from the right-hand magazine, at the outer edge of this cooky. A similarly L-shaped flexible member 37, of rubber or the like, has a lip 38 positioned to extend upwardly along the outer face of the opposite cooky, at the outer edge of this cooky. A wing nut 39 clamps the cooky retainer members 35 and 37, together with a guide member 40, to the bracket 17.

The assembly of the present invention also includes means for transferring the formed sandwich from beneath the nozzle 5. In the form of the invention illustrated in Figs. 1-15, this sandwich transferring means is in the form of a reciprocatory ejector, indicated generally at 41 in Figs. 1 and 3, having spaced, parallel, elongated plates 42 interconnected by rigid cross pins 43. The ejector 41 is rigidly connected by the cross pins 43 to a plate 44 which is reciprocable along a channel-shaped stationary slide member 45 bolted to the front panel 2 of the housing 1. Both the slide member 45 and the front panel 2 of the housing are formed with aligned, horizontally elongated apertures at 46 (Fig. 2) through which a bolt 47 connected to the reciprocatory plate 44 extends for pivotal attachment to a cam-operated reciprocatory connecting rod 48. As the connecting rod 48 is reciprocated, in a manner to be described in detail hereinafter, the ejector 41 reciprocates horizontally at the level at which the formed sandwich is supported to push the formed sandwich from beneath the nozzle to the left in Fig. 1.

In the operation of the sandwich support and transfer apparatus just described, the cooky support bracket 30 and the cooky retainer assemblies 35, 37 described above support a spaced, opposed pair of cookies in upright relation as the ice cream is discharged from the nozzle to fill the space between these cookies and to engage the inner faces of these cookies and form a sandwich with the cookies. After a sandwich has thus been formed, the ejector 41 moves to the left in Figs. 1 and 3 and engages the outer face of the right-hand cooky of the sandwich and pushes the sandwich to the left across the tops of the legs 31—33 of the support bracket 30. When the formed sandwich is thus moved to the left, transversely of the direction in which ice cream is discharged from the nozzle 5, the layer of ice cream engaged between the cookies of the sandwich is sheared off and separated from the stream of ice cream flowing continuously from the nozzle 5. The protruding lips 38 of the rubber cooky-retaining members 37 are readily deflected as the formed sandwich is moved past them to the left of the cooky retainer assembly 34.

*Bagging mechanism*

Figure 15:
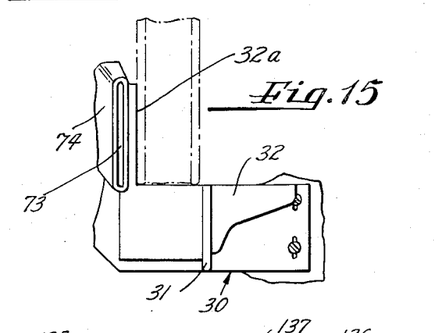
Figure 15 shows the support bracket for supporting the formed sandwich as it is transferred from beneath the nozzle to the bagging station.

After being transferred from beneath the nozzle, the sandwich is supported in an upright position by the rails 32, 33 of the support bracket 30 at a location just to the left of the guide 40 of the cooky retainer assembly. Vertical shoulders 32a and 33a which extend upward respectively from the bracket rails 32, 33 provide stops for limiting the movement of the sandwich to the left, as best seen in Fig. 15. Thereafter, the formed sandwich is pushed forwardly into a bag and discharged from the machine.

For this purpose there is provided an elongated push rod 50 carrying a sandwich-engaging head 51 at its outer end. The push rod 50 is mounted to the left of the nozzle 5 and the guide 40 for reciprocation toward and away from the front panel 2 of the housing 1. The reciprocatory push rod 50 extends back through a hole in front panel 2 of the housing (Fig. 11) and is formed at its upper side with a rack 52 adapted to mesh with a gear mechanism for reciprocating the push rod in and out, in a manner described in detail hereinafter. The push rod 50 is positioned to reciprocate above the sandwich-supporting top faces of the legs 32 and 33 on the sandwich support bracket 30, so that the head 51 engages the inner side of the formed sandwich which has just been transferred from beneath the nozzle and pushes this sandwich off the sandwich support bracket 30 in a forward direction, directly away from the front panel 2 of the housing 1.

As best seen in Fig. 11, the push rod 50 extends through a bearing sleeve 120 mounted in the front wall 2 of the housing and through bushings 121 and 122 mounted respectively in the front and rear walls of the housing 115 for a rack and gear mechanism for reciprocating push rod 50. For lubricating the push rod 50 as it reciprocates back and forth there is provided a water receptacle 123 mounted at the front of the front panel 2 and having a discharge conduit 124 terminating at its lower end just above the reciprocatory push rod 50. The water flow from the receptacle 123 is preferably adjusted to a slow rate, such as six drops per minute, sufficient to adequately lubricate the push rod 50.

Immediately in front and to the left of the sandwich support bracket 30 there is provided a bag magazine, indicated generally at 60. This bag magazine includes a channel-shaped chute 61 which is inclined upwardly and to the left and is suitably mounted on the front panel 2 of the housing 1. At the lower end of the chute 61 at its outer side there is formed an upstanding wall portion 62 (Fig. 10) integral with the chute 61. Releasably mounted on this wall portion 62 by means of wing nuts 63 is a bag retainer member 64 positioned to overlie the closed ends of the bags at the lower end of the chute and having a downwardly protruding finger 65 positioned to engage the lower forward face of the lowermost bag to prevent its accidental withdrawal from the bag magazine. The lower edge 71 of the flat bottom wall 61 of the chute is upturned at 72 to engage the lower edge of the forward face of the lowermost bag in the magazine for retaining it releasably on the magazine.

At the inner upstanding wall 66 of the chute 61 at its lower end there are formed a pair of transverse fingers 67 which protrude outwardly directly away from the front panel 2 of the housing 1. The bags 68 in the bag magazine are preferably of the type commonly used for packaging ice cream confections, having a shorter front side 69 and a longer back side presenting a flap 70 at the open end of the back which extends beyond the edge of the front side of the bag at its open end. The bag retaining fingers 67 are constructed and arranged so that they do not engage the front side of the lowermost bag in the magazine but they do engage the flap 70 at the back side of the bag at its open end to retain the bag in place.

Immediately to the right of the bag-retaining fingers 70 at the bag magazine there is located the discharge opening 73 of an air conduit 74, which is rigidly attached to the sandwich support bracket 30 and may be formed integral therewith (Figs. 12 and 15). The air conduit 74 receives air from a blower 75 mounted on the back side of the front panel 2 of the housing 1, so that with the lowermost bag in the magazine positioned as shown in Fig. 10 air is discharged from the conduit 74 into the open end of this bag and blows it open for the reception of a sandwich ejected by the push rod 50.

At the lower end of the bag chute 61 there is provided an overhanging arm 76, which is formed integral with the upstanding inner side wall 66 of the bag chute (Fig. 10). The arm 76 overlies the open ends of the lowermost bags in the stack and extends horizontally beyond the retaining fingers 67. The flat bottom wall of the bag chute 61 is formed at its lower end with a horizontal extension 77 which protrudes beyond the retaining fingers 67 and is located directly beneath the overhanging arm 75.

Hingedly mounted at the lower end of the bag chute 61 at the inner side thereof on the overhanging arm 76 and the bottom wall extension 77 are a pair of retaining plates 78 of the configuration shown in Fig. 10. Coil springs 79 act between these plates and the chute 61 to normally maintain the retaining plates 78 in upright position at the inner side of the bag magazine and just to the right of the discharge opening 73 of the air conduit 74 to prevent the sandwich from accidentally dropping off the sandwich support bracket 30.

A downwardly inclined, channel-shaped, discharge chute 80 (Fig. 1) is mounted on a cross rod 81 attached to the lower end of the bag magazine 61 and to the front panel of the housing.

In the operation of this mechanism at the bagging station of the machine, the sandwich after having been moved by the ejector 41 from beneath the nozzle 5 is supported in upright position on the sandwich support bracket 30 immediately behind the hinged retaining plates 78 at the lower end of the bag magazine. Initially the push rod 50 is in its retracted position directly behind this sandwich. The lowermost bag on the bag chute 61 is retained thereon as shown in Fig. 10, with the bag being blown open by air from the conduit 74. When the push rod 50 is moved outwardly the head 51 carried by the push rod engages the inner edge of the sandwich and pushes the sandwich outwardly away from the front panel 2 of the housing. The sandwich is thus forced along the guide 40 past the retaining plates 78, which are retracted against their spring bias out of the path of the sandwich. The sandwich is pushed into the open end of the lowermost bag and then upon continued forward movement of the push rod 50 the sandwich is pushed completely into this bag. The weight of the sandwich causes the bag to tear loose from the bag-retaining fingers 65, 67, 72 at the lower end of the bag magazine, and the sandwich and bag drop onto the chute 80, from which they pass to a further packaging operation.

A drip tray 82 (Fig. 1) of channel-shaped construction is releasably mounted on a mounting bolt 83 attached to the front wall of the housing and extending outwardly therefrom. The drip tray 82 is positioned below the sandwich support bracket 30 and the nozzle discharge opening 6 and is inclined downward to the left for passing to a suitable receptacle any ice cream which may drip down during the sandwich forming and transfer operations described above.

Drive Mechanism

Figure 2:
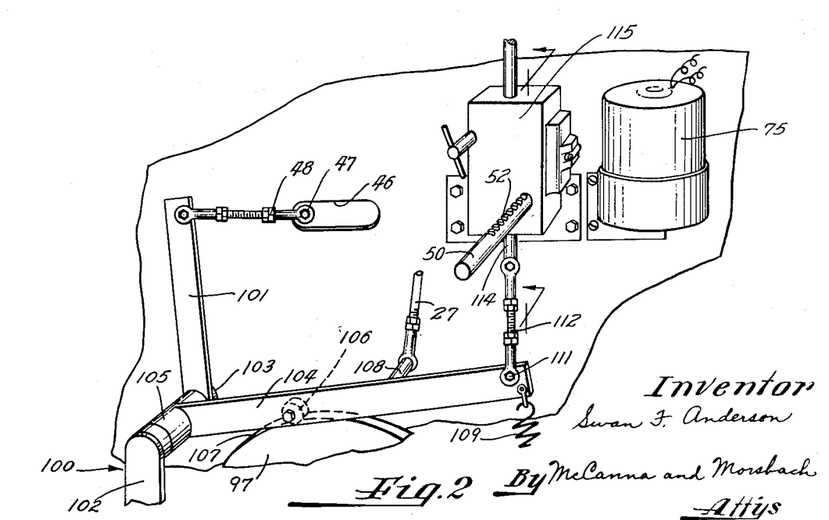
Figure 2 is a fragmentary perspective view of a portion of the drive mechanism for driving the various moving parts of the machine.

For driving the cooky feed plates 21, the ejector 41 and the push rod 50 in suitable timed relation with respect to one another, there is provided the drive mechanism shown in Figs. 2, 3 and 11.

Referring to Fig. 3, within the housing 1 behind the front panel 2 there is provided a driving motor 90 having its rotary otuput shaft coupled to a pulley 91, which drives a pulley 92 through the belt 93. Pulley 92 is mounted on the input shaft 94 of a speed reduction unit 95. The speed reduction unit has a rotary output shaft 96 which carries a cam 97, which controls the positions of the cooky feed plates 21, the ejector 41 and the push rod 50.

The cam 97 is formed at one face with a cam groove 98 in which is located a cam roller 99 mounted on the lower end of an elongated throw arm 100. At its upper end the throw arm 100 is pivotally connected to the connecting rod 48 for reciprocating the ejector 41 of the mechanism for transferring the formed sandwiches from beneath the nozzle 5.

Intermediate its length the upper and lower legs 101 and 102 (Fig. 2) of the throw arm 100 are interconnected by a cross pin 103. A cam lever 104 (Fig. 2), having an integral cylindrical sleeve 105 at one end which encircles the cross pin 103, carries a cam roller 106 which engages the outer cam edge 107 of the cam 97. Cam lever 104 carries a cross pin 108 which is pivotally connected to the lower end of the connecting rod 27 for operating the vertically reciprocatory cooky feed plates 21. At its outer end the lever 104 is connected to the upper end of a tension coil spring 109, which has its lower end connected to a fixed anchor 110. The spring 109 pulls downward on the outer end of the cam lever 104 and continuously maintains the roller 106 carried by this cam lever in engagement with the outer cam edge 107 of cam 97.

At its outer end the cam lever 104 also carries a cross pin 111 which is pivotally connected to an upwardly extending connecting rod 112. As best seen in Fig. 11, the connecting rod 112 at its upper end is pivotally connected to a cross pin 113 carried on the lower end of a vertical rack 114. The rack 114 extends upwardly through gear housing 115 and meshes with a gear 116 carried on a rotary shaft 117. Shaft 117 also carries a larger gear 118, which meshes with the rack portion 52 of the horizontally reciprocatory push rod 50 of the bagging mechanism. The rack and gear casing 115 is mounted directly on the rear of the front panel 2 of the housing of the machine, next to the mounting for the blower 75 thereat, as shown in Fig. 2.

In the operation of this drive mechanism, the motor 90 through the above-described belt drive causes the cam 97 to rotate. The cam groove 98 coacts with the roller 99 carried on the lower end of the throw arm 100 to effect a complete reciprocation of horizontally reciprocatory ejector 41 for each full revolution of the cam. The construction of the cam and cam follower arrangement for reciprocating the ejector 41 is such that the ejector 41 is retracted much more rapidly than it moves during its sandwich transferring forward stroke. This enables the ejector 41 to be retracted rapidly from beneath the nozzle 5 to avoid having the contining stream of ice cream from the nozzle drip down onto the ejector 41.

The spring 109 and the cam roller 106 carried by the cam lever 104 cooperate with the cam 97 to control the position of the lever 104 in accordance with the outer cam surface 107 on the cam. The lever 104 through the connecting rod 27 effects a complete reciprocation of the vertically reciprocatory cooky feed plates 21 for each full revolution of cam 97. Also, through the connecting rod 112 and the rack and gear mechanism 114, 116—118 and 52, the cam lever 104 also effects a complete reciprocation of the horizontally reciprocatory push rod 50 of the bagging mechanism for each full revolution of cam 97.

Operation

In the operation of the above-described mechanism, the cookies are supported in vertical edgewise relation on the cooky magazines 8, with the lowermost cooky in each stack supported by the rubber lips 18 at the respective opposite sides of the nozzle 5. Initially, (Fig. 4) it may be assumed that the cooky feed plates 21 are in their uppermost, retracted positions, the ejector 41 is retracted away from beneath the nozzle 5, and the push rod 50 at the bagging mechanism is retracted rearwardly through the front panel 2 of the housing 1.

Figure 5:
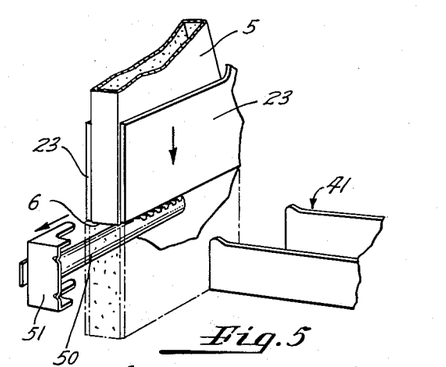
Figure 6:
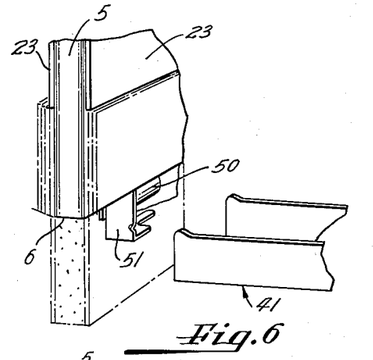
Figure 7:
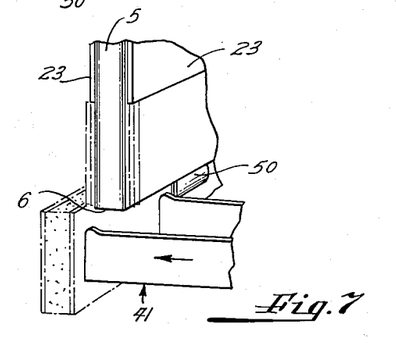

Ice cream in a semi-liquid or plastic state is discharged in a continuous sheet-like stream from the discharge opening 6 at the lower end of the nozzle 5. The above-described drive mechanism causes the cooky feed plates 21 to move downward (Fig. 5) simultaneously to engage the top edges of the lowermost cookies on opposite sides of nozzle 5 and to push these cookies downward past the resilent supporting lips 18 onto the sandwich support bracket 30. During this action of the cooky feed plates 21 the ejector 41 is maintained in its retracted position, while the push rod 50 is moved outward to its extended position (Fig. 5). The cookies are moved downward at this time faster than the ice cream is discharged from the nozzle, the ice cream expanding as it leaves the nozzle and engaging the inner faces of these cookies and filling the space between the cookies to form the filler of the sandwich.

After the cooky feed plates 21 have fed the cookies downward onto the support bracket 30, the cooky feed plates are retracted upwardly (Fig. 6), the ejector 41 begins its forward stroke, and the push rod 50 is retracted. The cookies are supported by the bracket 30 and the retainer assemblies 35, 37 in spaced, vertically extending, edgewise relation while the ice cream continues to flow downwardly and fill the space between the cookies. At the completion of this filling the ejector 41 engages the sandwich and pushes it to the left (Fig. 7) from beneath the nozzle 5, this movement of the sandwich transversely of the continuing downward flow of ice cream from the nozzle 5 causing the layer of ice cream engaged between the cookies of the sandwich to be sheared off from the ice cream stream.

Figures 8, 9:
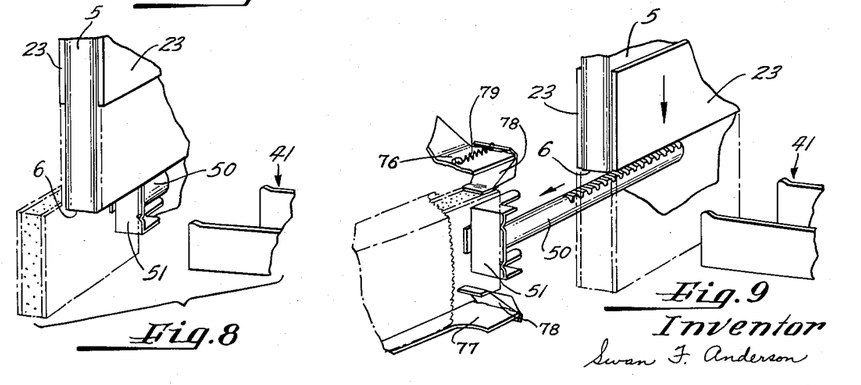

With the completed sandwich having been transferred from beneath the nozzle to the position where it is to be bagged, the ejector 41 is retracted rapidly (Fig. 8). The push rod 50 moves in its forward stroke outwardly from the front panel 2 of the housing and engages the inner side edge of the sandwich and moves the sandwich toward the bag which is to receive it. At the bag magazine the lowermost bag in the stack will have been blown open to receive the sandwich.

Then (Fig. 9), during the completion of the forward stroke of the push rod 50 for pushing the sandwich into the bag, the cooky feed plates 21 commence to move downward again to feed the next pair of cookies from the cooky magazines for forming the next sandwich with the continuous stream of ice cream being discharged from the nozzle.

Thereafter the foregoing sequence of operations is repeated successively to continuously form sandwiches having as the filler the ice cream which is discharged in a continuous stream from the nozzle 5, to transfer the formed sandwiches from beneath the nozzle to a bagging station, and to insert the sandwiches into bags, as described.

*Alternative transfer mechanism*

Figure 16:
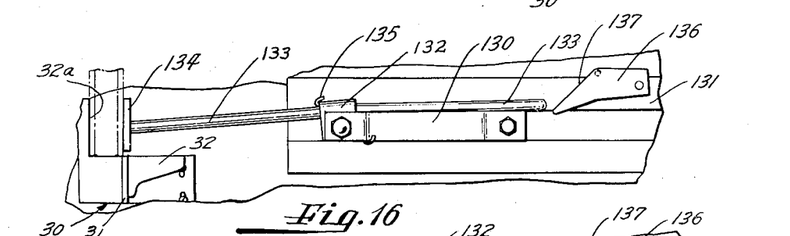
Figure 16 is a front elevational view of an alternative ejector mechanism for transferring the formed sandwich from beneath the nozzle to the bagging station.
Figure 17:
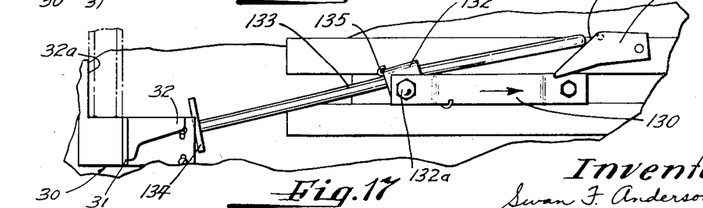
Figure 17 is a view of the Fig. 16 ejector mechanism showing the manner in which the sandwich-engaging part of this ejector is deflected as it passes below the nozzle while being retracted.

In Figs. 16 and 17 there is shown an alternative mechanism for transferring the formed sandwiches from beneath the nozzle, in place of the ejector mechanism described above. In this alternative embodiment there is provided a horizontally reciprocatory bracket member 130 mounted for reciprocation along ways defined by a stationary slide member 131 bolted to the front panel 2 of the housing. Both the front panel 2 and the stationary slide member 131 are formed with aligned, horizontally elongated apertures (not shown) for passing a cross pin connected to the bracket 130, so that the bracket 130 may be connected to the connecting rod 48 in the same manner as shown in Fig. 2, whereby the bracket 130 is reciprocable by the drive mechanism to the connecting rod 48 described in detail above.

A transversely extending yoke 132 is pivotally mounted on a cross pin 132a at the forward end of the reciprocatory bracket 130. The yoke 132 carries one or more elongated rods 133 which at one end carry an ejector plate 134 positioned to engage the sandwich and to push it from beneath the nozzle. A torsion spring 135 acts between the yoke 132 and the bracket 130 to normally position the rods 133 substantially horizontal as shown in Fig. 15, and the ejector plate 134 in substantially vertical relation.

At the right-hand end of the stationary slide 131 there is provided a stationary cam member 136 which presents an upwardly inclined cam surface 137 across which the free end of the innermost rod 133 is adapted to ride when the reciprocatory bracket is retracted.

In the operation of this mechanism, when the bracket 130 is moved to the left it carries the yoke 132, rods 133 and ejector plate 134 to the left, with the torsion spring 135 maintaining the rods 133 substantially horizontal. The ejector plate 134 engages the outer face of the right-hand cooky of the sandwich and, as the reciprocatory bracket 130 is continued to be moved to the left, the ejector plate 134 pushes the formed sandwich from beneath the nozzle.

When the reciprocatory bracket 130 is retracted to the right, the free end of the outermost rod 133 of the ejector assembly engages and rides across the upwardly inclined cam face 137, as shown in Fig. 15. This tilts the pivotally mounted assembly of yoke 132, rods 133 and ejector plate 134, causing the ejector plate 134 to move downwardly as it passes beneath the nozzle while being retracted. This downward tilting of the ejector plate 134 as it is being retracted insures that it will not shear off the lowermost portion of the descending stream of ice cream, which is being discharged continuously from the nozzle.

This application is a continuation-in-part of my copending application Serial No. 135,134, filed December 27, 1949, and now U. S. Patent No. 2,639,677, dated May 26, 1953.

While in the foregoing description and in the accompanying drawings there are disclosed preferred embodiments of the present invention, it is to be understood that the invention is susceptible of various embodiments and that various modifications, omissions and refinements which depart from the disclosed embodiments of the invention may be adopted without departing from the spirit and scope of the present invention.

I claim:

1. In a sandwich forming machine having a nozzle with a downwardly opening mouth shaped to discharge a continuous ribbon-like web of plastic comestible supplied thereto under pressure and means for simultaneously feeding wafers down along opposite sides of the nozzle and the advancing web to spaced positions at opposite sides of the nozzle below the nozzle mouth for the reception of the advancing web therebetween to form a sandwich, the improvement which comprises the combination of a support disposed below the nozzle positioned for engagement by the wafers to support the sandwich below the nozzle mouth in upright position and extending over to one side of the nozzle mouth, means for moving the formed sandwich transversely of the nozzle mouth to sever the formed sandwich from the web and to position the severed sandwich on said support at said one side of the nozzle mouth in an upright position, and means movable transversely of the direction in which the formed sandwich is thus moved and operative at said one side of the nozzle mouth in timed relation with the severing of the formed sandwich for moving said sandwich from the support in an upright position and for inserting said sandwich in a wrapper.

2. In a sandwich forming machine, the combination of a nozzle having a downwardly opening mouth shaped to discharge a continuous ribbon-like web of plastic comestible supplied thereto under pressure, means for simultaneously feeding wafers down along opposite sides of the nozzle and the advancing web to spaced positions at opposite sides of the nozzle below the nozzle mouth for the reception of the advancing web therebetween to form a sandwich, a support below the nozzle positioned for engagement by the wafers to support the sandwich below the nozzle mouth in upright position, ejector means for moving the formed sandwich in an upright position across the support transversely of the nozzle mouth to sever the formed sandwich from the web, an upright stop located at the side of the nozzle toward which the formed sandwich is thus moved for engaging the sandwich moved by said ejector means to position the sandwich at a predetermined location on the support, pusher means operative in timed relation with the severing of the formed sandwich from the web for moving the sandwich in an upright position in a direction transverse the direction of movement of the sandwich by said ejector means to move the sandwich along said stop and into a wrapper.

3. In a sandwich forming machine, the combination of a nozzle with a downwardly opening mouth shaped to discharge a continuous ribbon-like web of plastic comestible supplied thereto under pressure, means for feeding wafers to spaced positions at opposite sides of the nozzle below the nozzle mouth for the reception of the web therebetween to form a sandwich, a reciprocable ejector movable transversely below the nozzle between a retracted and an extended position on opposite sides of the nozzle to move the formed sandwich transversely past the nozzle mouth to sever the formed sandwich from the web, and means for reciprocating said ejector to return the ejector from its extended position to its retracted position at a speed greater than the movement of the ejector from its retracted to its extended position.

4. In a sandwich making machine having mechanism for forming a sandwich having plastic comestible retained between two spaced wafers, the improvement which comprises the combination of means for transferring the formed sandwich to a position away from said sandwich forming mechanism, a magazine adjacent said position releasably retaining a stack of open-ended bags with their open ends facing an edge of the formed sandwich at said position, and a reciprocable pusher operative to engage the formed sandwich at said position and move the sandwich therefrom out of the path of movement of the sandwiches carried by said ejector and push the same into the lowermost bag in the stack to detach said bag from the magazine.

5. In a sandwich forming machine having a nozzle with a mouth shaped to form a ribbon-like web from plastic comestible supplied thereto under pressure and means for feeding wafers to positions adjacent the nozzle mouth and on opposite sides of the web to engage the comestible and form a sandwich therewith, the improvement which comprises the combination of means for moving the formed sandwich in a direction transversely of the web to sever the sandwich from the web and position the formed sandwich at one side of the nozzle in an upright position, a magazine supporting open-ended bags in stacked relation at said side of the nozzle, means for releasably retaining the lowermost bag in the stack on said magazine in an upright position at said one side of the nozzle and laterally offset from the path of movement of the ejector with its open end facing an edge of the formed sandwich, and a member movable at said side of the nozzle for pushing the formed sandwich in a direction transverse said one direction into said lowermost bag at the open end thereof and to separate said bag from the magazine due to the weight of the sandwich therein.

6. In a sandwich forming machine having a nozzle with a mouth shaped to discharge a continuous ribbon-like web of plastic comestible supplied thereto under pressure, means for feeding wafers to spaced positions at opposite sides of the nozzle beyond the nozzle mouth for the reception of the web therebetween to form a sandwich, and means for moving the formed sandwich in one direction across the nozzle mouth to sever the formed sandwich from the web and to position the formed sandwich at one side of the nozzle, the improvement which comprises a magazine for supporting open-ended bags in stacked relation at said side of the nozzle, means for releasably retaining on the magazine a bag at one end of the stack in an upright position at said one side of the nozzle and laterally offset from the path of movement of the ejector with its open end facing an edge of the formed sandwich, and a member movable at said one side of the nozzle for pushing the formed sandwich in a direction transverse said one direction to move the sandwich out of the path of said ejector and into said bag at the open end thereof and to detach said bag from the magazine due to the weight of the sandwich therein.

7. In a sandwich forming machine having a nozzle with a downwardly opening mouth shaped to discharge a continuous ribbon-like web of plastic comestible supplied thereto under pressure, means for feeding wafers to spaced positions at opposite sides of the nozzle below the nozzle mouth for the reception of the web therebetween to form a sandwich, and an ejector for moving the formed sandwich transversely past the nozzle mouth to sever the formed sandwich from the web, the improvement which comprises an upright stop positioned in the path of movement of the sandwich carried by the ejector to position the sandwich at a predetermined location at one side of the nozzle, a magazine for supporting open-ended bags in stacked relation at said one side of the nozzle, means for releasably retaining on the magazine a bag at one end of the stack in an upright position and laterally offset from the path of movement of the ejector with its open end facing an edge of the formed sandwich at said location, and a member movable transversely of the ejector to engage the formed sandwich and to move the formed sandwich along said stop transversely of its movement by said ejector into said bag at the open end thereof and to detach said bag from the magazine due to the weight of the sandwich therein.

8. In a sandwich forming machine, the combination of a nozzle having a mouth shaped to form a ribbon-like web from plastic comestible supplied thereto under pressure, feed plates for feeding wafers to positions adjacent the nozzle mouth and on opposite sides thereof to engage the web and form a sandwich therewith, an ejector for severing the formed sandwich from the web, rotary cam means, a plurality of cam followers engaging said cam means, and connections from said cam followers to said feed plates and said ejector to move said feed plates and said ejector in a predetermined timed sequence.

9. In a sandwich forming machine, the combination of a nozzle having a mouth shaped to form a ribbon-like web from plastic comestible supplied thereto under pressure, reciprocatory feed plates for feeding wafers to positions adjacent the nozzle mouth and on opposite sides thereof to engage the web and form a sandwich therewith, a reciprocatory ejector for moving the sandwich across the nozzle to sever the sandwich from the web and position the sandwich at one side of the nozzle, a reciprocatory pusher movable in a direction transverse the direction of movement of the ejector for moving the formed sandwich from the position at one side of the nozzle into a wrapper, a first cam operated means connected to said pusher and said reciprocatory plates simultaneously operating said reciproctory plates to feed wafers and said pusher to move a formed sandwich from the position at one side of the nozzle, a second cam operated means for reciprocating said ejector, and means for operating said first and second cam operated means in timed relation.

10. The combination of claim 9 including a rack and pinion for reciprocating said pusher, said first cam operated means including a lever, and links connecting said lever to said plates and said rack.

11. In a sandwich forming machine having a nozzle with a mouth shaped to discharge a ribbon-like web of plastic comestible supplied thereto under pressure and means for successively feeding wafers simultaneously to positions adjacent the nozzle and on opposite sides of the web to engage the comestible and form a sandwich therewith, the improvement which comprises the combination of a horizontally disposed support located adjacent the nozzle mouth for engagement by the wafers to support a formed sandwich at the nozzle mouth, said support extending laterally to one side of the nozzle, ejector means mounted for engagement with a formed sandwich on the support at the nozzle mouth for moving the formed sandwich along the support in a direction past the nozzle to pass an edge of one wafer across the nozzle mouth and sever the web and to position said sandwich at a location on said support at one side of said nozzle mouth, and means for moving the sandwich at said location in a direction transverse the direction of movement of the sandwich by said ejector means to move the sandwich out of the path of a succeeding sandwich carried by the ejector means and into a wrapper.

12. In a sandwich forming machine having a nozzle with a mouth shaped to discharge a continuous ribbon-like web of plastic comestible supplied thereto under pressure and means for simultaneously feeding wafers to spaced positions at opposite sides of the nozzle below the nozzle mouth for the reception of the web therebetween to form a sandwich, the improvement which comprises the combination of a horizontally disposed support located adjacent the nozzle mouth for engagement by the wafers to support a formed sandwich at the nozzle mouth, said support extending laterally of the nozzle over to one side thereof, ejector means mounted for engagement with a formed sandwich on said support at the nozzle mouth for moving the formed sandwich transversely of the nozzle mouth and along said support to sever the formed sandwich from the web and to position the formed sandwich at a location on said support disposed at said one side of the nozzle mouth, and pusher means located at said side of the nozzle mouth for engagement with a formed sandwich at said location on the support and operative in timed relation with the severing of the formed sandwich from the web for moving the formed sandwich at said location in a direction transverse the direction of movement of said sandwich by said ejector means to move the sandwich out of the path of a succeeding sandwich carried by the ejector means and into a wrapper.

13. In a sandwich forming machine having a nozzle with a mouth shaped to discharge a continuous ribbon-like web of plastic comestible supplied thereto under pressure and means for simultaneously feeding wafers to spaced positions at opposite sides of the nozzle beyond the nozzle mouth for the reception of the web therebetween to form an upright sandwich, the improvement which comprises the combination of a horizontally disposed support located adjacent the nozzle mouth for engagement by the wafers to support a formed sandwich thereon in an upright position at the nozzle mouth, said support extending laterally of the nozzle over to one side thereof, ejector means mounted for engagement with a formed bar on said support at the nozzle mouth for moving the formed sandwich across said support transversely across the nozzle mouth to sever the formed sandwich from the web and to position the severed sandwich on said support at said one side of the nozzle mouth in an upright position, and a pusher means mounted for reciprocation into and out of engagement with a formed sandwich at said location on the support operative to disengage the severed sandwich from the support and move the sandwich in an upright position in a direction transverse the direction of movement of the sandwich by said ejector means to move the sandwich out of the path of a succeeding sandwich carried by the ejector and insert the severed sandwich into a wrapper.

14. In a sandwich forming machine, the combination of a nozzle having a mouth shaped to form a ribbon-like web from plastic comestible supplied thereto under pressure, reciprocatory feed plates for feeding wafers to positions adjacent the nozzle mouth and on opposite sides thereof to engage the web and form a sandwich therewith, a reciprocatory ejector for moving the formed sandwich transversely of the web to sever the sandwich from the web and for moving the formed sandwich from beneath the nozzle to a position at one side thereof, a reciprocatory pusher for moving the formed sandwich from said position and for inserting the formed sandwich into a wrapper, rotary cam means, a plurality of cam followers engaging said cam means, means including a first link operatively connected to one of said followers and to said feed plates for reciprocating the latter in response to rotation of said cam means, means including a second link operatively connected to another of said followers and to said ejector for reciprocating the latter in response to rotation of said cam means, means operatively connecting said first link to said pusher for reciprocating the pusher in response to movement of said first link, and means for driving said rotary cam means to thereby reciprocate the feed plates, the ejector and pusher in a predetermined timed sequence.

References Cited in the file of this patent

UNITED STATES PATENTS

| | | |
|---|---|---|
| 1,482,138 | Moomjian | Jan. 29, 1924 |
| 1,716,266 | Flamm | June 4, 1929 |
| 1,792,203 | Wakefield | Feb. 10, 1931 |
| 1,960,456 | Robb | May 29, 1934 |
| 2,124,387 | Taylor | July 19, 1938 |
| 2,337,117 | Lloyd | Dec. 21, 1943 |
| 2,521,213 | Gentry | Sept. 5, 1950 |
| 2,639,677 | Anderson | May 26, 1953 |